(12) United States Patent
Pio

(10) Patent No.: US 10,932,006 B2
(45) Date of Patent: Feb. 23, 2021

(54) SYSTEMS AND METHODS FOR PREVIEWING CONTENT

(71) Applicant: Facebook, Inc., Menlo Park, CA (US)

(72) Inventor: David Young Joon Pio, Santa Clara, CA (US)

(73) Assignee: Facebook, Inc., Menlo Park, CA (US)

( * ) Notice: Subject to any disclaimer, the term of this patent is extended or adjusted under 35 U.S.C. 154(b) by 166 days.

(21) Appl. No.: 15/852,896

(22) Filed: Dec. 22, 2017

(65) Prior Publication Data

US 2019/0200089 A1 Jun. 27, 2019

(51) Int. Cl.
*H04N 21/472* (2011.01)
*H04N 21/845* (2011.01)
*H04N 21/8549* (2011.01)

(52) U.S. Cl.
CPC . *H04N 21/47217* (2013.01); *H04N 21/47202* (2013.01); *H04N 21/8456* (2013.01); *H04N 21/8549* (2013.01)

(58) Field of Classification Search
CPC ......... H04N 21/47217; H04N 21/8456; H04N 21/8549; H04N 21/47202
See application file for complete search history.

(56) References Cited

U.S. PATENT DOCUMENTS

| | | | | |
|---|---|---|---|---|
| 8,255,815 B2* | 8/2012 | Ording | ................ | G06F 3/04817 715/764 |
| 9,602,849 B2* | 3/2017 | Lin | ................ | H04N 21/234327 |
| 10,074,015 B1* | 9/2018 | Grundmann | ....... | G06K 9/00765 |
| 10,386,999 B2* | 8/2019 | Burns | ................ | H04N 21/8456 |
| 2008/0183843 A1* | 7/2008 | Gavin | .................... | G06Q 30/06 709/217 |
| 2009/0058822 A1* | 3/2009 | Chaudhri | ............ | G06F 3/04883 345/173 |
| 2009/0153389 A1* | 6/2009 | Kerr | .................... | H04N 5/44513 341/176 |
| 2009/0153478 A1* | 6/2009 | Kerr | .................... | H04N 5/4403 345/158 |
| 2010/0027958 A1* | 2/2010 | Ubillos | .................. | G11B 27/34 386/248 |
| 2010/0303440 A1* | 12/2010 | Lin | .................... | H04N 21/6581 386/241 |
| 2012/0151383 A1* | 6/2012 | Kazan | ..................... | H04L 67/02 715/753 |
| 2012/0210230 A1* | 8/2012 | Matsuda | .............. | G11B 27/034 715/723 |
| 2012/0210231 A1* | 8/2012 | Ubillos | ............... | G11B 27/034 715/723 |
| 2012/0321280 A1* | 12/2012 | Lin | ..................... | G11B 27/105 386/240 |

(Continued)

*Primary Examiner* — Shourjo Dasgupta
(74) *Attorney, Agent, or Firm* — Sheppard Mullin Richter & Hampton LLP

(57) ABSTRACT

Systems, methods, and non-transitory computer-readable media can cause a content item to be presented through a display screen of the computing device, the presentation of the content item beginning at a first time position. A determination is made that a user operating the computing device has adjusted the presentation of the content item to correspond to a second time position. A thumbnail preview that corresponds to the second time position is obtained from a composite preview video associated with the content item.

20 Claims, 11 Drawing Sheets

(56) References Cited

U.S. PATENT DOCUMENTS

| | | | |
|---|---|---|---|
| 2013/0018960 A1* | 1/2013 | Knysz | H04L 65/403 709/204 |
| 2016/0070962 A1* | 3/2016 | Shetty | G06K 9/00718 382/225 |
| 2016/0196852 A1* | 7/2016 | Sievert | G11B 27/3027 386/241 |
| 2017/0223411 A1* | 8/2017 | de Juan | G06F 3/03543 |
| 2017/0330598 A1* | 11/2017 | Choi | G11B 27/19 |

* cited by examiner

SYSTEMS AND METHODS FOR PREVIEWING CONTENT

FIELD OF THE INVENTION

The present technology relates to the field of content presentation. More particularly, the present technology relates to techniques for generating previews for content.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

SUMMARY

Various embodiments of the present disclosure can include systems, methods, and non-transitory computer readable media configured to cause a content item to be presented through a display screen of the computing device, the presentation of the content item beginning at a first time position. A determination is made that a user operating the computing device has adjusted the presentation of the content item to correspond to a second time position. A thumbnail preview that corresponds to the second time position is obtained from a composite preview video associated with the content item.

In an embodiment, the systems, methods, and non-transitory computer readable media are configured to cause the thumbnail preview to be presented through the display screen of the computing device.

In an embodiment, the composite preview video is composed of a set of frames that each correspond to a thumbnail preview for some portion of the content item.

In an embodiment, the systems, methods, and non-transitory computer readable media are configured to determine at least one frame in the composite preview video that corresponds to the second time position and provide the frame as the thumbnail preview.

In an embodiment, the systems, methods, and non-transitory computer readable media are configured to generate the composite preview video for the content item.

In an embodiment, the systems, methods, and non-transitory computer readable media are configured to obtain a set of thumbnail preview images for the content item, each thumbnail preview image corresponding to some duration of the content item and store the thumbnail preview images as frames of the composite preview video.

In an embodiment, the systems, methods, and non-transitory computer readable media are configured to receive the composite preview video for the content item from a content provider system through which the content item is being streamed.

In an embodiment, the systems, methods, and non-transitory computer readable media are configured to determine that a video playback scrubber was moved to the second time position.

In an embodiment, the systems, methods, and non-transitory computer readable media are configured to generate a composite preview image from the composite preview video.

In an embodiment, thumbnail previews for the content item are obtained from either the composite preview video or the composite preview image.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
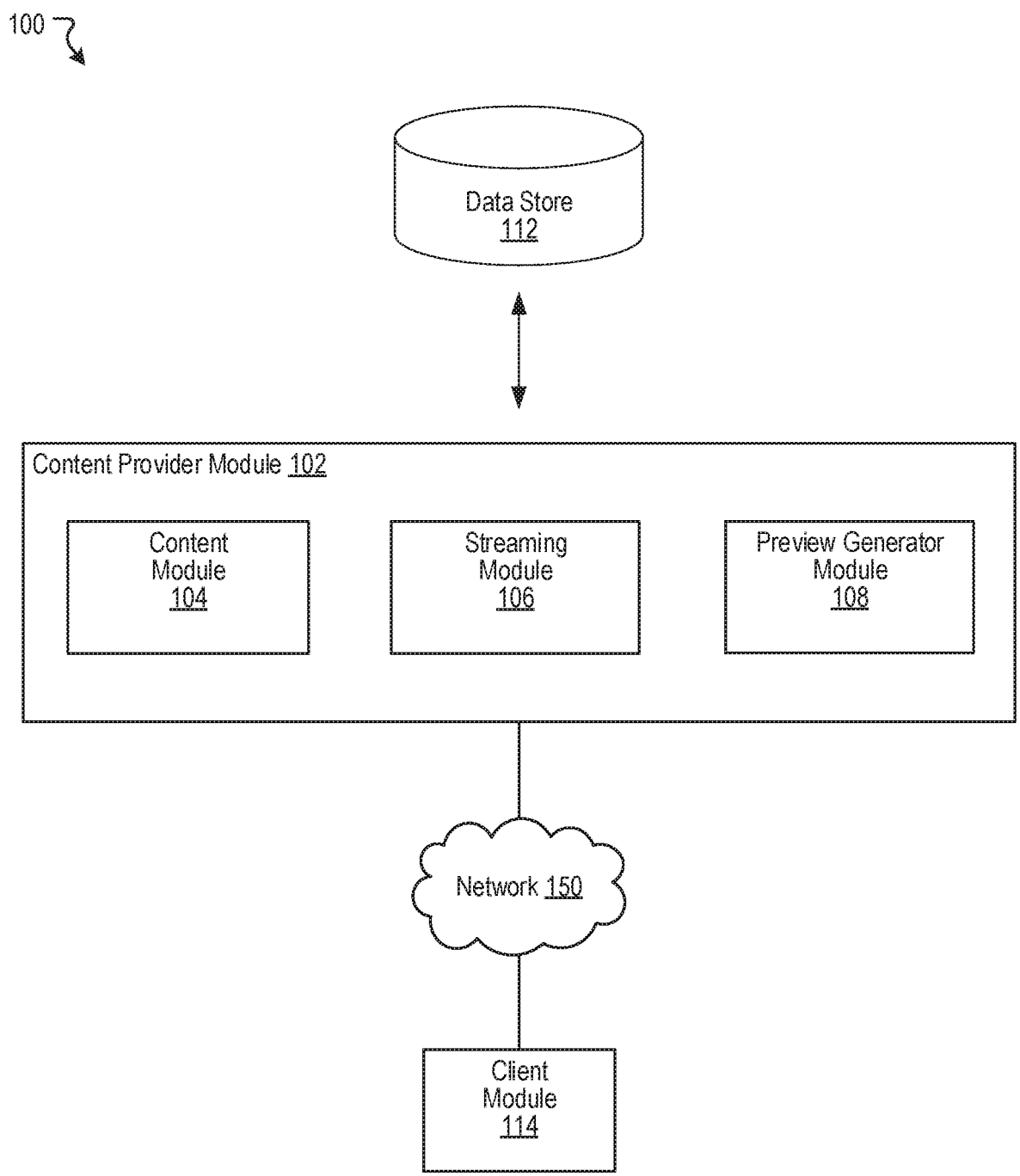
FIG. 1 illustrates an example system including an example content provider module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Previewing Content

People often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, users can generate previews (e.g., thumbnail previews) for content items (e.g., videos). For example, a publisher can specify (or request) thumbnail preview images to be generated for a given content item. Each thumbnail preview image can correspond to one or more frames in the content item at some specific playback time (or for some playback time interval). In some embodiments, these thumbnail preview images are stitched together using generally known techniques to form a composite preview image. For example, the composite preview image can be assembled as a grid of thumbnail preview images. Depending on its playback duration, a content item may have multiple composite preview images, each of which include thumbnail preview images for some portion of the content item.

When a given content item is streamed (or played), a content provider can send a corresponding composite preview image to a computing device through which the content item was requested. The content item being streamed can be presented through a software application (e.g., video player) running on the computing device. During presentation, a user operating the computing device can seek (or scrub) (e.g., rewind or fast forward to) different portions of the content item. For example, in some instances, the software application can provide a user interface element (e.g., video playback scrub bar) for skipping to different portions of a content item being presented. In some embodiments, when the user scrubs to a different portion of the content item, a thumbnail preview corresponding to that portion of the content item can be presented through the software application. This thumbnail preview gives the user an indication of the content that will be presented if the portion of the content item is played. In such embodiments, when selecting the thumbnail preview to be shown, the computing device typically searches the composite preview image for an appropriate thumbnail preview image to be presented. This searching of thumbnail preview images can degrade the overall user experience, especially when a content item is associated with multiple composite preview images. Moreover, sending multiple composite preview images for content items that have a long playback duration may degrade network performance. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, a composite preview video can be created to include thumbnail previews for a given content item. In such embodiments, each frame (or set of frames) of the composite preview video can correspond to a given thumbnail preview for the content item. When the content item is streamed (or played), a content provider can send a corresponding composite preview video to a computing device through which the content item was requested. The content item being streamed can be presented through a software application (e.g., video player) running on the computing device. During presentation, a user operating the computing device can scrub to a different portion of the content item. In some embodiments, when the user scrubs to a different portion of the content item, the computing device can access at least one frame that corresponds to the different portion of the content item from the composite preview video. This frame can be presented through the software application to provide the user an indication of the content that will be presented if the portion of the content item is played. The use of a composite preview video to provide thumbnail previews provides a number of advantages. For example, in some embodiments, a single composite preview video can be generated for a content item regardless of its playback duration. In another example, composite preview videos can be compressed more efficiently than composite preview images.

FIG. 1 illustrates an example system 100 including an example content provider module 102, according to an embodiment of the present disclosure. As shown in the example of FIG. 1, the content provider module 102 can include a content module 104, a streaming module 106, and a preview generator module 108. In some instances, the example system 100 can include at least one data store 112. A client module 114 can interact with the content provider module 102 over one or more networks 150 (e.g., the Internet, a local area network, etc.). The client module 114 can be implemented in a software application running on a computing device. In various embodiments, the network 150 can be any wired or wireless computer network through which devices can exchange data. For example, the network 150 can be a personal area network, a local area network, or a wide area network, to name some examples. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user computing device or client computing system. For example, the content provider module 102, or at least a portion thereof, can be implemented as or within an application (e.g., app), a program, or an applet, etc., running on a user computing device or a client computing system, such as the user device 610 of FIG. 6. Further, the content provider module 102, or at least a portion thereof, can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 630 of FIG. 6. It should be understood that there can be many variations or other possibilities.

In some embodiments, the content provider module 102 can be configured to communicate and/or operate with the at least one data store 112 in the example system 100. In various embodiments, the at least one data store 112 can store data relevant to the function and operation of the content provider module 102. One example of such data can be content items that are available for access (e.g., streaming). In some implementations, the at least one data store 112 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data. It should be appreciated that there can be many variations or other possibilities.

In various embodiments, the content module 104 can provide access to various content items that can be presented through a viewport. This viewport may be provided through a display of a computing device in which the client module 114 is implemented, for example. In some instances, the computing device may be running a software application (e.g., social networking application, video player, etc.) that is configured to present content items. In one example, the computing device in which the client module 114 is implemented can request presentation of a content item. In this example, the streaming module 106 can stream data corresponding to the content item to be presented through the computing device. In some embodiments, the streaming module 106 can provide thumbnail preview data for the content item. In some embodiments, the thumbnail preview data is sent in the form of one or more composite preview images. In some embodiments, thumbnail the preview data is sent in the form of a composite preview video.

In some embodiments, the preview generator module 108 can be configured to generate thumbnail preview data for content items. This thumbnail preview data can be used to provide previews during presentation of content items. For example, the preview generator module 108 can be configured to generate composite preview images and/or composite preview videos for content items. More details describing the preview generator module 108 will be provided below in reference to FIG. 2.

Figure 2:
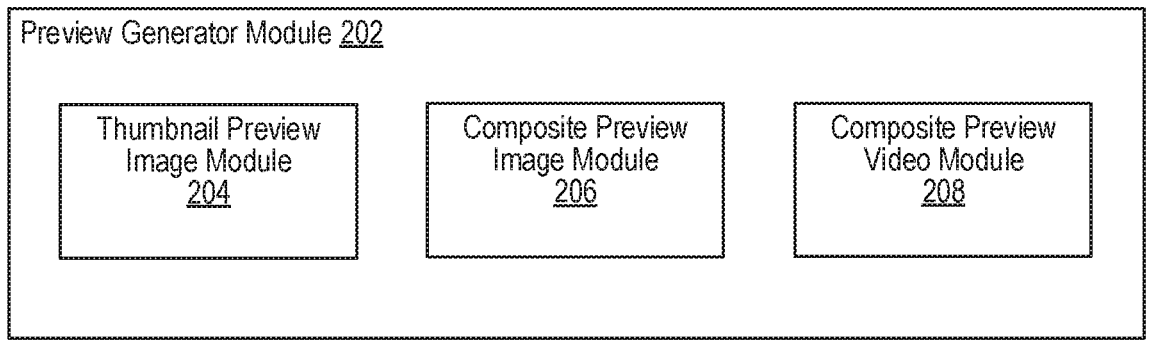
FIG. 2 illustrates an example preview generator module, according to an embodiment of the present disclosure.

FIG. 2 illustrates an example of a preview generator module 202, according to an embodiment of the present disclosure. In some embodiments, the preview generator module 108 of FIG. 1 can be implemented as the preview generator module 202. As shown in FIG. 2, the preview generator module 202 can include a thumbnail preview image module 204, a composite preview image module 206, and a composite preview video module 208.

In some embodiments, the thumbnail preview image module 204 can be configured to generate thumbnail previews for a given content item. For example, a publisher of a content item can generate thumbnail preview images for the content item. In some instances, the publisher can manually specify the frames in the content item from which the thumbnail preview images will be generated. In some embodiments, the thumbnail preview images for the content item can be generated automatically. For example, in some embodiments, thumbnail preview images can be generated at specific time intervals. In one example, a thumbnail preview image can be generated for every 1 second of content in the content item. In general, each thumbnail preview image can correspond to one or more frames in the content item. For example, a thumbnail preview image can be generated for every 1 second of content in a content item that streams at 60 frames per second. In this example, each thumbnail preview image corresponds to 60 frames of content. Naturally, the manner and rate at which thumbnail preview images are generated can vary depending on the implementation.

In some embodiments, the composite preview image module 206 can be configured to generate one or more composite preview images for a given content item. In some embodiments, each composite preview image is created using a set of individual thumbnail preview images. In such embodiments, some, or all, of the thumbnail preview images can be stitched together to form one or more composite preview images. For example, a composite preview image can be assembled as a grid (or table) of thumbnail preview images. In some instances, multiple composite preview images may be generated for a content item depending on the length of the content item's playback duration. For example, a content item having a playback duration of 1 hour may have 3,600 thumbnail preview images. In this example, creating a single composite preview image using the 3,600 thumbnail preview images may degrade the rate at which previews are presented. Thus, in some embodiments, the thumbnail preview images for the content item are distributed over multiple composite preview images. In the example above, the content item may have six individual composite preview images that are each created using 600 thumbnail preview images. In some embodiments, any composite preview images associated with a given content item can be sent to a computing device that requests presentation of the content item. The computing device can use the composite preview images to provide thumbnail previews as described below in reference to FIG. 3.

In some embodiments, the composite preview video module 208 can be configured to generate a composite preview video for a given content item. In some embodiments, the composite preview video is composed of frames that correspond to thumbnail preview images that were generated for the content item. In such embodiments, each thumbnail preview image can correspond to one or more frames of the composite preview video. For example, a thumbnail preview image can be generated for a content item at some recurring time interval (e.g., every 1 second of content). In this example, each of the thumbnail preview images can be stored as one or more frames in the composite preview video at corresponding time intervals. For example, a thumbnail preview image that corresponds to second 3 (0:03) of the content item can be included in frames that correspond to second 3 of the composite preview video. This organization of the composite preview video is provided as just one example and, naturally, many variations are possible. For example, in some embodiments, the frame rate at which the composite preview video is generated need not correspond to the frame rate of the content item and may vary depending on the implementation. In some embodiments, any composite preview videos associated with a given content item can be sent to a computing device that requests presentation of the content item. The computing device can use the composite preview videos to provide thumbnail previews as described below in reference to FIG. 3.

In some embodiments, providing a single composite preview video that includes all of the thumbnail previews for a given content item can be more efficient than individually providing multiple composite preview images for the content item. In such embodiments, the single composite preview video can be sent to a computing device that accesses the content item. The computing device can use the composite preview video to provide thumbnail previews. In some embodiments, the computing device is configured to generate one or more composite preview images from the composite preview video. In such embodiments, the computing device can use the composite preview images to provide thumbnail previews either independently or in combination with the composite preview video as described below in reference to FIG. 3.

Figure 3:
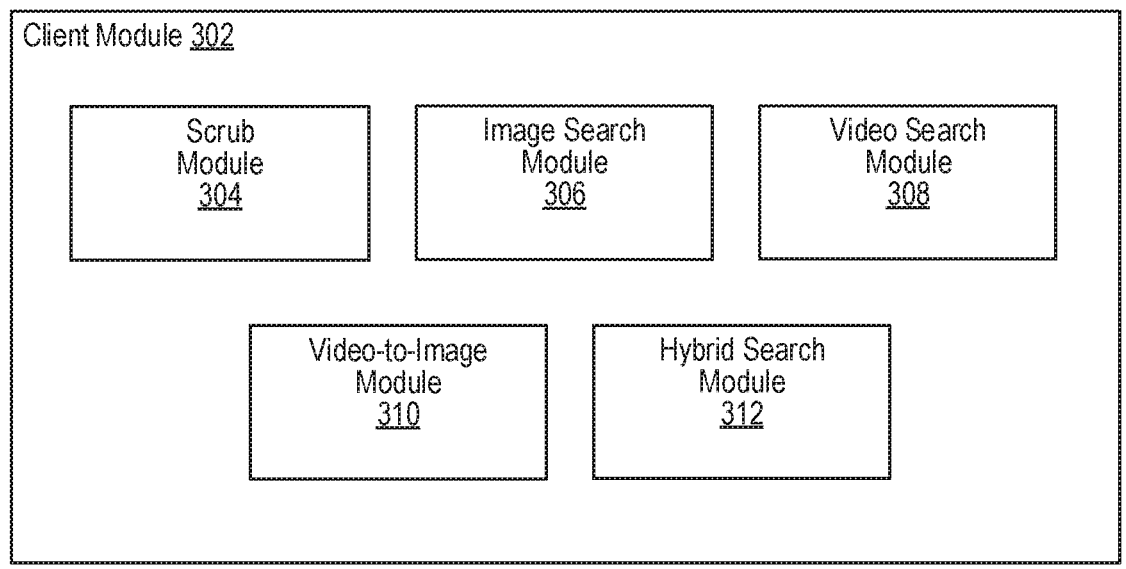
FIG. 3 illustrates an example client module, according to an embodiment of the present disclosure.

FIG. 3 illustrates an example of a client module 302, according to an embodiment of the present disclosure. In some embodiments, the client module 114 of FIG. 1 can be implemented as the client module 302. As shown in FIG. 3, the client module 302 can include a scrub module 304, an image search module 306, a video search module 308, a video-to-image module 310, and a hybrid search module 312.

In some embodiments, the scrub module 304 can be configured to determine video playback scrubbing information during presentation of a content item through a computing device. As mentioned, the content item can be presented through a software application (e.g., video player) running on the computing device. During presentation, a user operating the computing device can seek (or scrub) to different portions of the content item. For example, the software application can provide a video playback scrubber that can be used to skip to different portions of the content item being presented. In some embodiments, when the user moves the video playback scrubber to a different portion of the content item, the scrub module 304 can determine the playback time corresponding to the video playback scrubber. This playback time can be used to determine a corresponding thumbnail preview using a composite preview image and/or a composite preview video, as described below.

In some embodiments, the image search module 306 can identify thumbnail previews to be presented from a composite preview image corresponding to the content item. For example, during presentation of the content item, a user operating the computing device can move the video playback scrubber to a given playback time. This playback time can be used to identify the appropriate thumbnail preview image from the composite preview image. The composite preview image may be composed of individual thumbnail preview images organized by time (or time intervals), for example. In this example, the image search module 306 can locate the thumbnail preview image associated with the playback time (or time interval) that corresponds to the video playback scrubber. The thumbnail preview image can then be presented as a preview through the software application running on the computing device to provide the user an indication of the content that will be presented at the given playback time.

In some embodiments, the video search module 308 can identify thumbnail preview images to be presented from a composite preview video corresponding to the content item. For example, when the content item is accessed through a computing device, a content provider can stream data corresponding to the content item to the computing device. In some embodiments, the content provider also sends data corresponding to the composite preview video for the content item. During presentation of the content item, a user operating the computing device can move a video playback scrubber to a given playback time. This playback time can be used to identify the appropriate thumbnail preview from the composite preview video. In some embodiments, the computing device determines a frame in the composite preview video that corresponds to the same playback time that corresponds to the video playback scrubber. This frame can then be presented as the thumbnail preview. For example, if the playback time specified by the video playback scrubber corresponds to second 3 (0:03) of the content item, then the computing device can obtain the frame corresponding to second 3 of the composite video. This frame can then be presented as a thumbnail preview through the software application to provide the user an indication of the content that will be presented at the given playback time.

In some embodiments, rather than transmitting the entire composite preview video to the computing device, the content provider can provide the computing device with frames from the composite preview video to be shown as thumbnail previews. For example, when the content item is accessed through a computing device, a content provider can stream data corresponding to the content item to the computing device. During presentation of the content item, a user operating the computing device can move a video playback scrubber to a given playback time. This playback time can be provided to the content provider. The content provider can determine a frame in the composite preview video that corresponds to the same playback time. The content provider can then provide the frame to the computing device for presentation as a thumbnail preview.

In some instances, it may be beneficial to provide computing devices with the option to obtain thumbnail previews from either a composite preview video or a composite preview image depending on the individual capabilities of the computing devices. Thus, in some embodiments, the video-to-image module 310 can be configured to generate one or more composite preview images from a composite preview video. For example, in such embodiments, the video-to-image module 310 can extract frames from the composite preview video. These frames can then be stitched together to create one or more composite preview images, as described above.

In some embodiments, the hybrid search module 312 can be configured to provide thumbnail previews using either a composite preview video or a composite preview image. As mentioned, computing devices can vary in their individual capabilities. To improve the user experience, the hybrid search module 312 can choose to obtain thumbnail previews from a composite preview video or a composite preview image based on the capabilities of the computing device. For example, in some embodiments, the hybrid search module 312 can measure the seek time when obtaining thumbnail previews from a composite preview video. If the measured seek time satisfies a threshold value, the hybrid search module 312 can obtain subsequent thumbnail previews for the content item from composite preview images. In some embodiments, the hybrid search module 312 can maintain an average seek time for obtaining thumbnail previews from the composite preview video. In such embodiments, if the average seek time satisfies a threshold value, the hybrid search module 312 can obtain subsequent thumbnail previews for the content item from a composite preview image. Similarly, in some embodiments, the hybrid search module 312 can measure the search time needed to obtain thumbnail previews from a composite preview image. If the measured search time satisfies a threshold value, the hybrid search module 312 can obtain subsequent thumbnail previews for the content item using the composite preview video. In some embodiments, the hybrid search module 312 can maintain an average search time for obtaining thumbnail previews from composite preview images. In such embodiments, if the average search time satisfies a threshold value, the hybrid search module 312 can obtain subsequent thumbnail previews for the content item using the composite preview video.

Figure 4A:
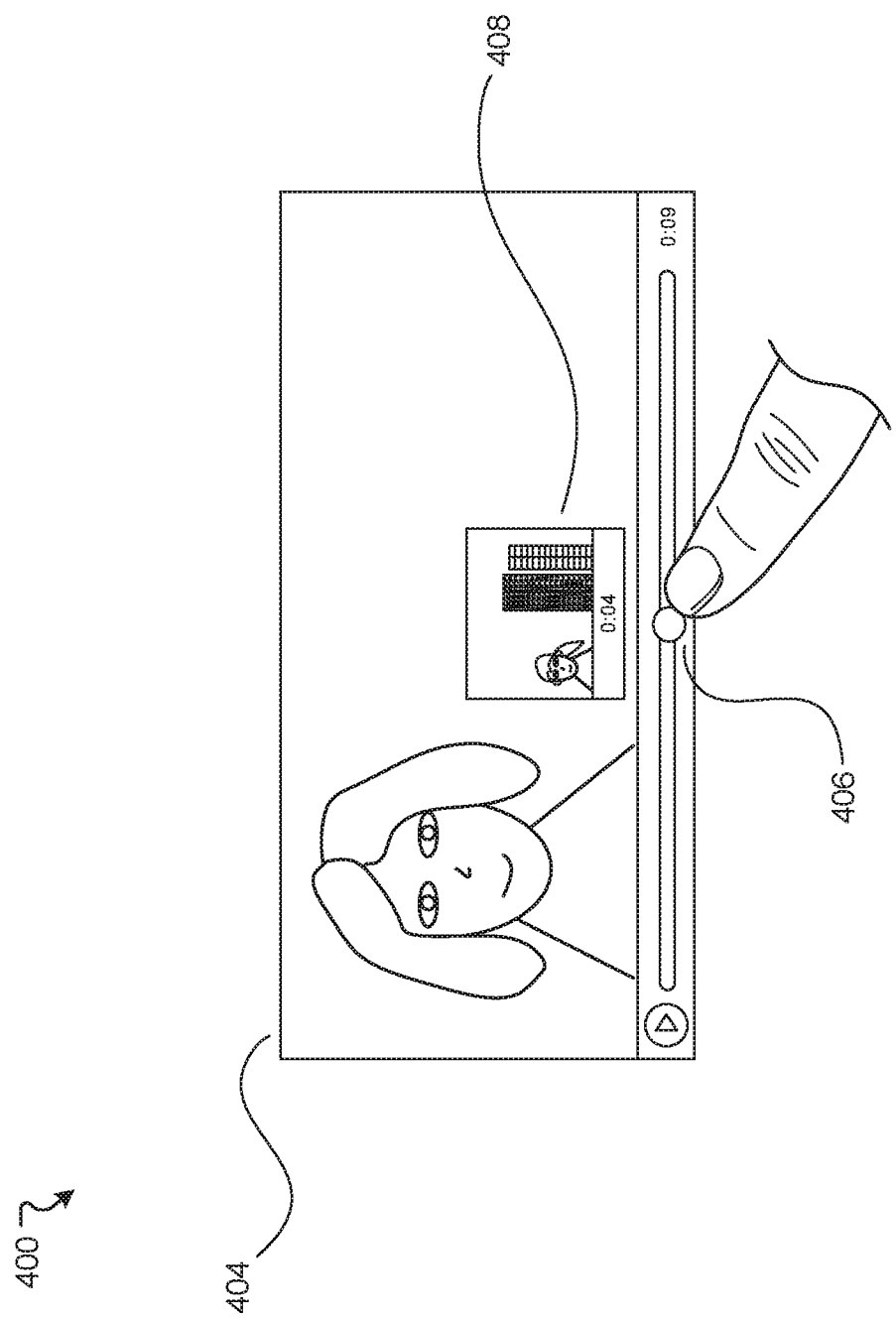
FIGS. 4A-E illustrate example diagrams, according to various embodiments of the present disclosure.

FIG. 4A illustrates an example diagram 400 of a software application (e.g., video player) 404 running on a computing device. In this example, the video player 404 is presenting a content item being streamed from a content provider. As mentioned, in some instances, the video player 404 can provide a video playback scrubber 406 for skipping to different portions of the content item being presented. In some embodiments, when the user scrubs to a different portion of the content item, a thumbnail preview 408 corresponding to that portion of the content item can be presented through the software application. This thumbnail preview 408 gives the user an indication of the content that will be presented if that portion of the content item is played.

Figure 4B:
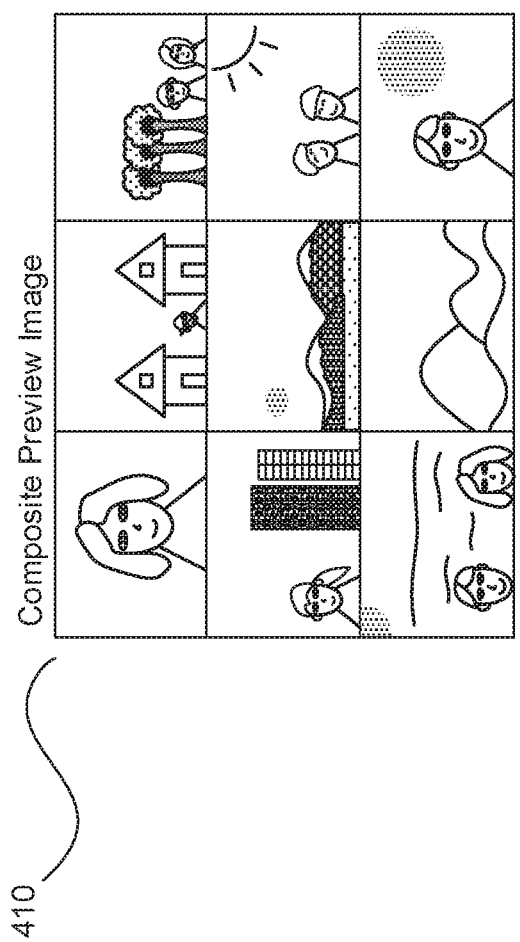
Figure 4C:
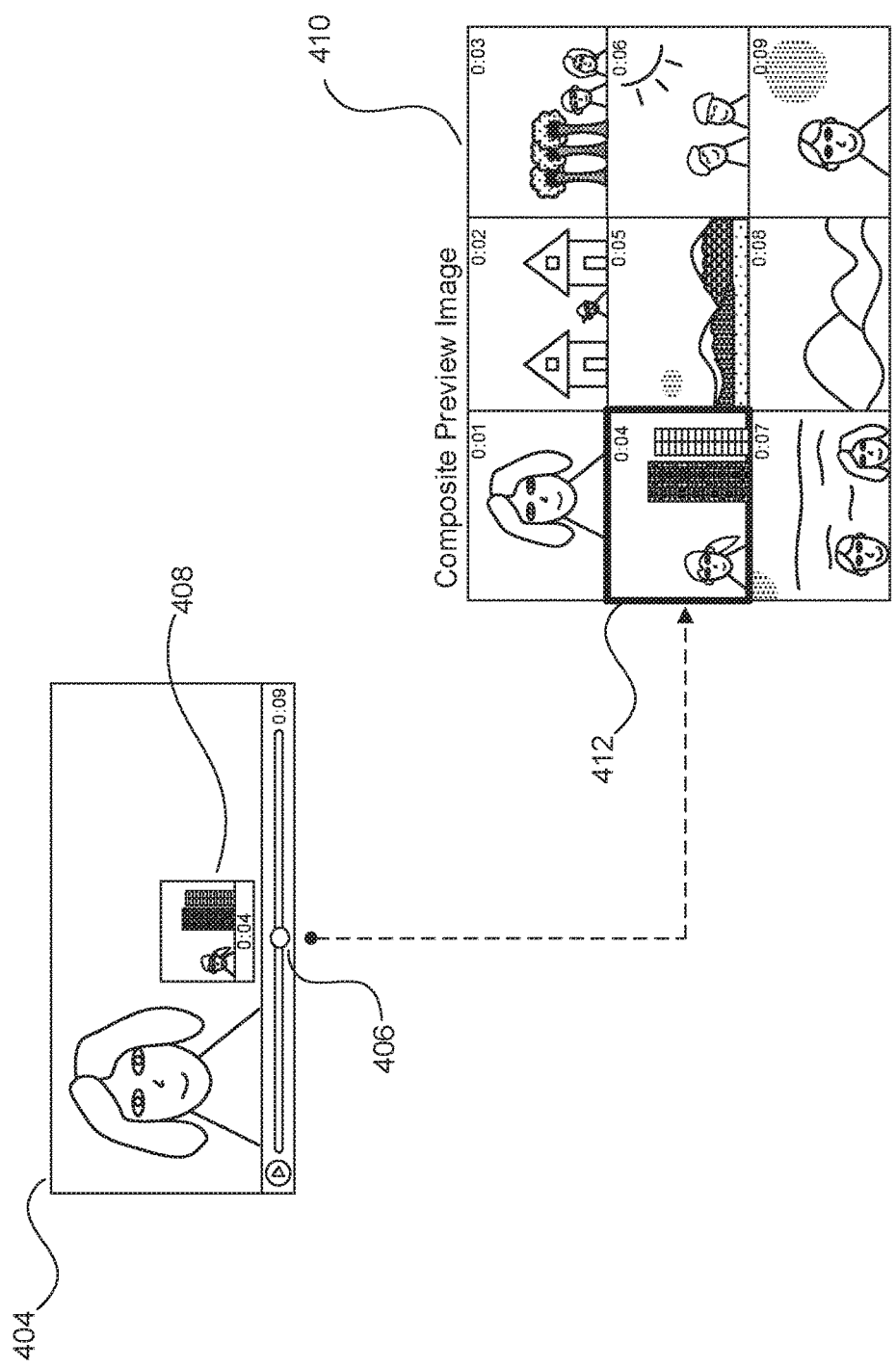

In some embodiments, the thumbnail preview 408 can be determined using a composite preview image 410 corresponding to the content item, as illustrated in the example of FIG. 4B. As shown in FIG. 4B, the composite preview image 410 can be created by stitching together individual thumbnail preview images that were generated for the content item. In some embodiments, when searching the composite preview image 410, the computing device can determine a playback time corresponding to the video playback scrubber. This playback time can be correlated to a thumbnail preview image in the composite preview image 410. For example, as illustrated in the example of FIG. 4C, a determination can be made that the video playback scrubber 406 was moved to a particular playback time (e.g., second 4) of the content item. In this example, a thumbnail preview image 412 can be identified from the composite preview image 410 based on the particular playback time (e.g., second 4). This thumbnail preview image 412 can then be presented as the thumbnail preview 408.

Figure 4D:
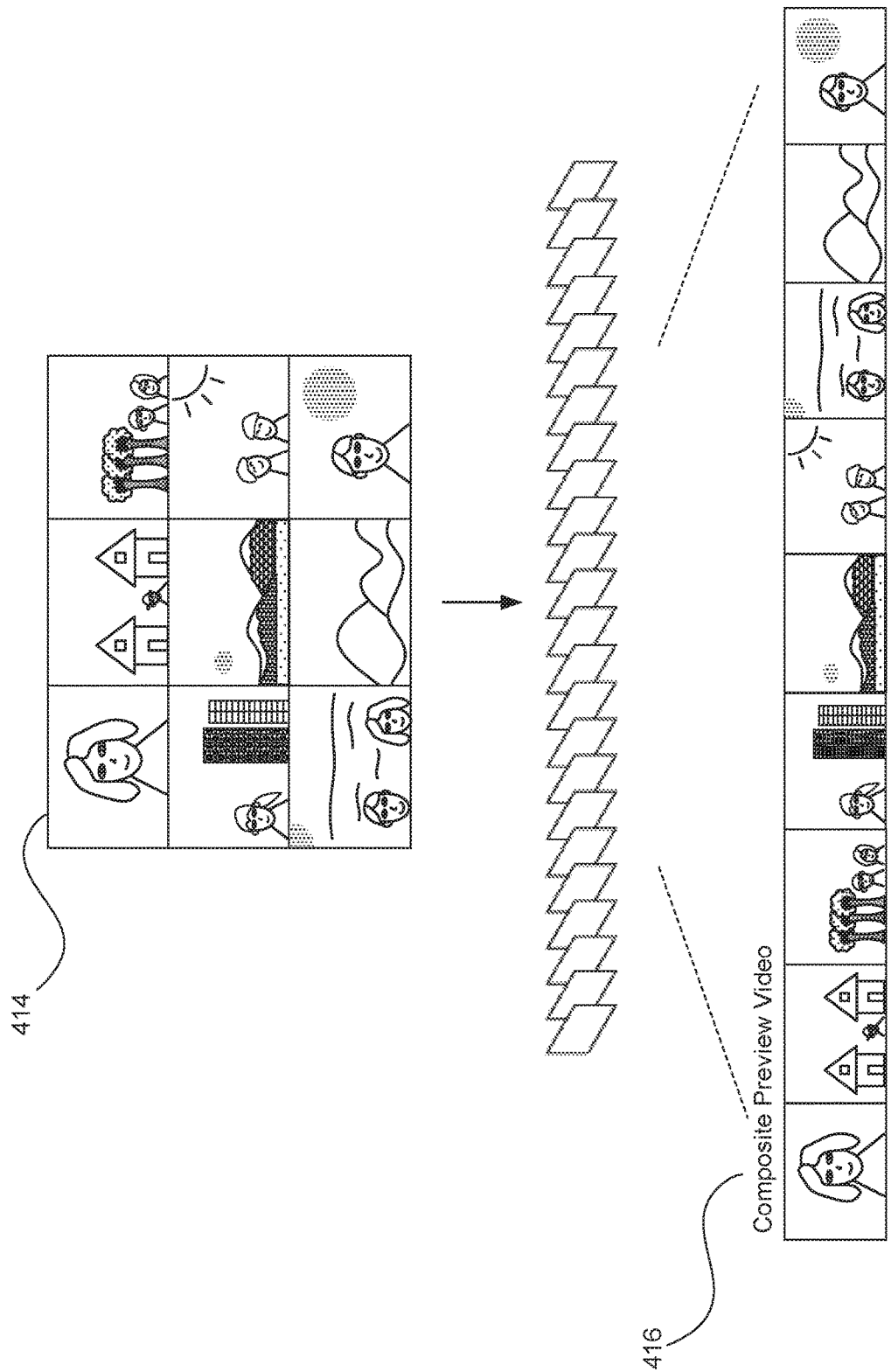
Figure 4E:
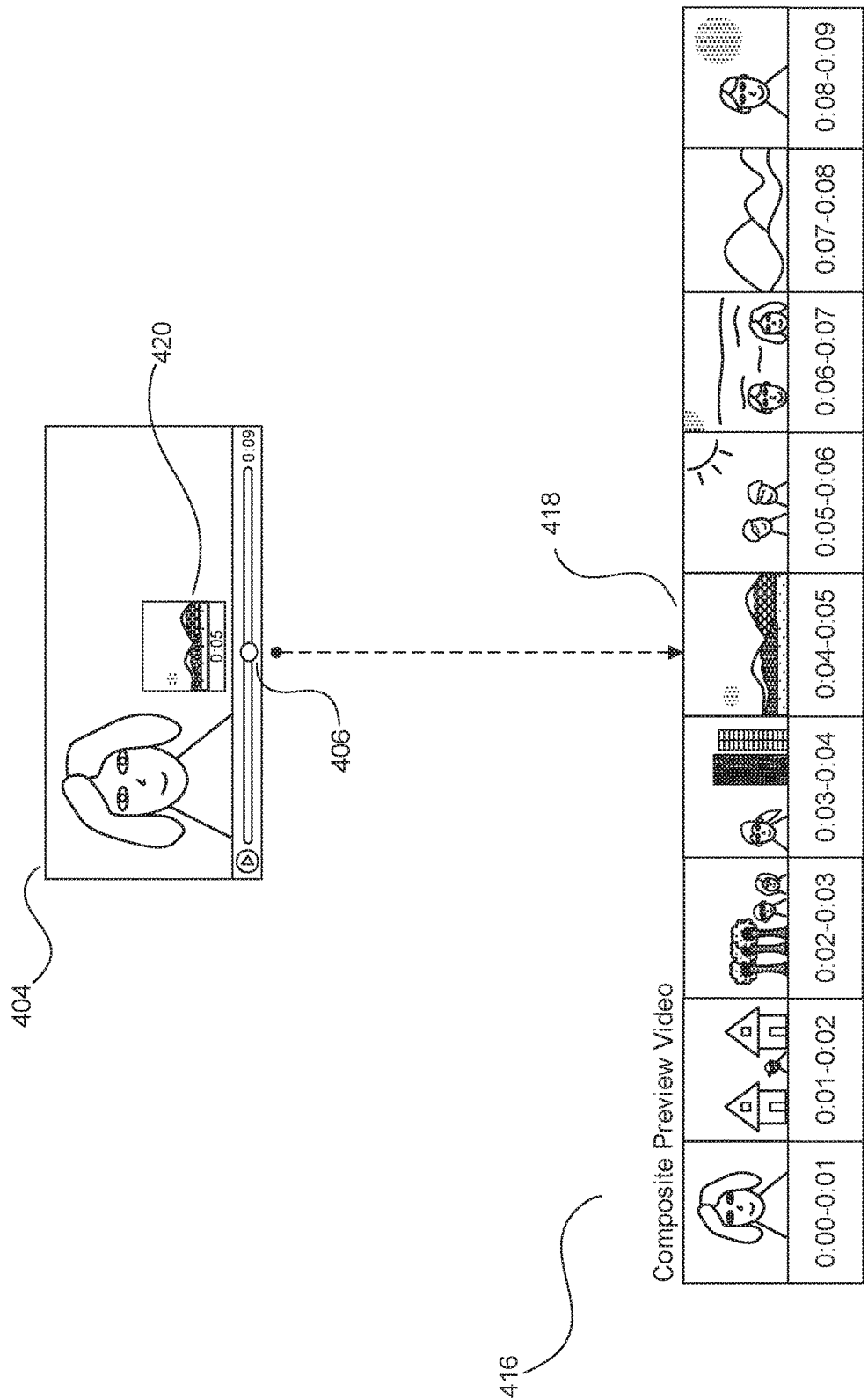

In some embodiments, the thumbnail preview 408 can be determined using a composite preview video 416 corresponding to the content item, as illustrated in the example of FIG. 4D. As shown in FIG. 4D, the composite preview video 416 can be composed of frames corresponding to thumbnail preview images 414 that were generated for the content item, as described above. In some embodiments, when searching the composite preview video 416, the computing device can determine a playback time corresponding to the video playback scrubber 406. This playback time can be correlated to one or more frames in the composite preview video 416. For example, as illustrated in the example of FIG. 4E, a determination can be made that the video playback scrubber 406 was moved to a particular playback time (e.g., second 5) of the content item. In this example, a frame 418 can be identified from the composite preview video 416 based on the particular playback time (e.g., second 5). This frame 418 can then be presented as a thumbnail preview 420 through the video player 404.

Figure 5:
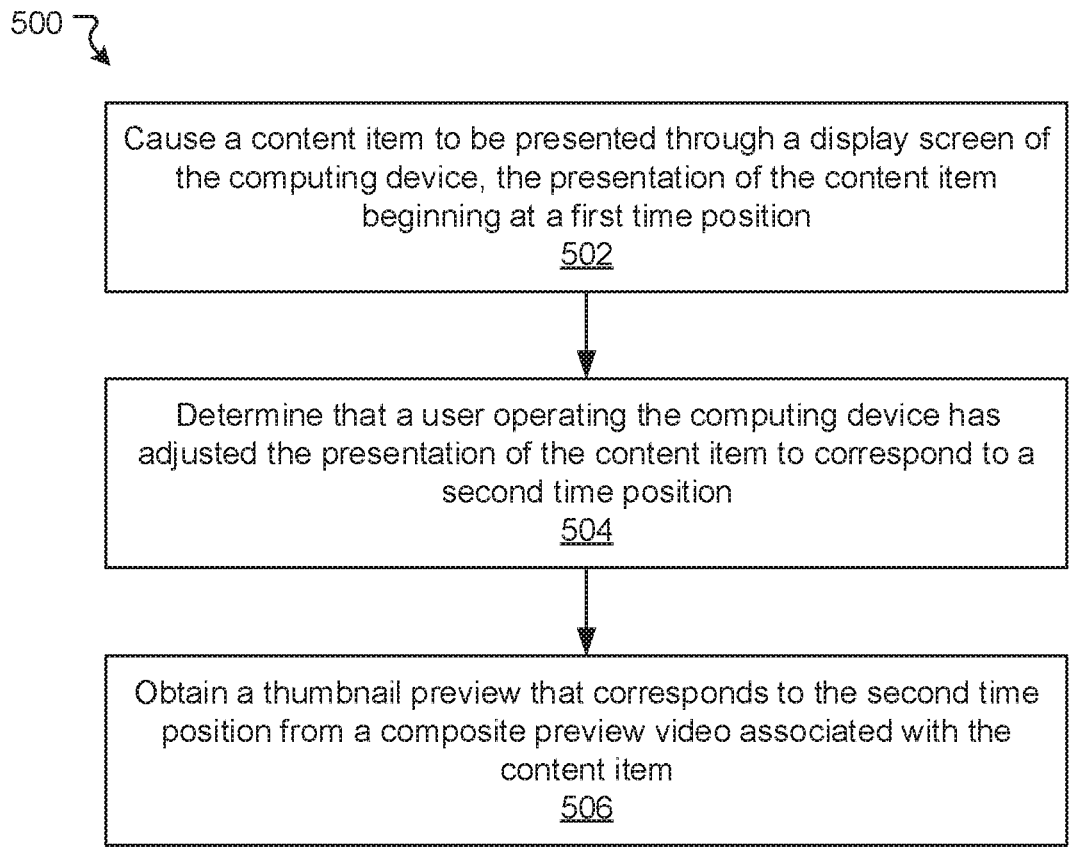
FIG. 5 illustrates an example process, according to various embodiments of the present disclosure.

FIG. 5 illustrates an example process 500, according to various embodiments of the present disclosure. It should be appreciated that there can be additional, fewer, or alternative steps performed in similar or alternative orders, or in parallel, within the scope of the various embodiments discussed herein unless otherwise stated.

At block 502, a content item is presented through a display screen of a computing device, the presentation of the content item beginning at a first time position. At block 504, a determination is made that a user operating the computing device has adjusted the presentation of the content item to correspond to a second time position. At block 506, a thumbnail preview that corresponds to the second time position is obtained from a composite preview video associated with the content item.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
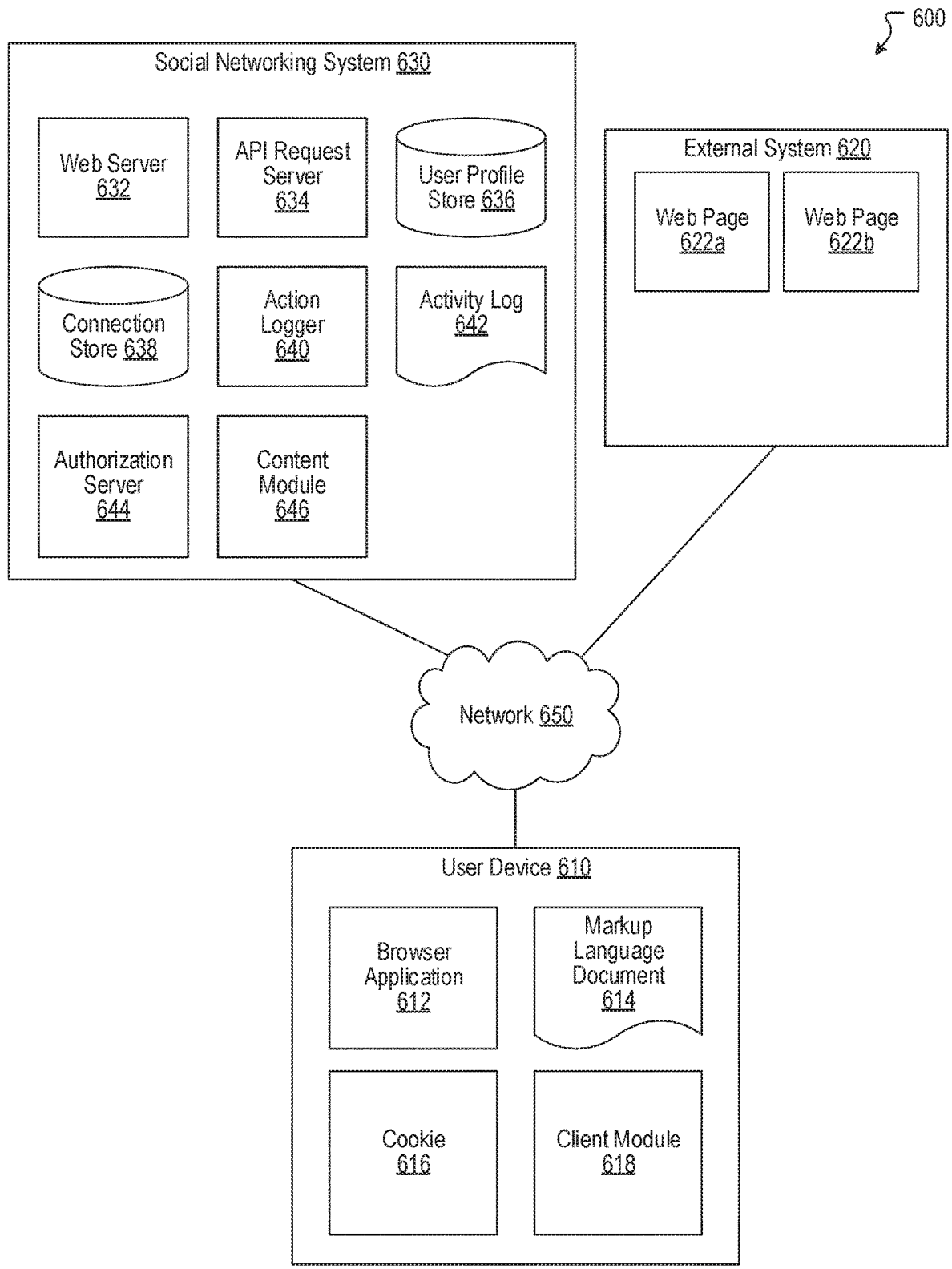
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content module 646. The content module 646 can, for example, be implemented as the content module 102 of FIG. 1. In some embodiments, the content provider module 646, or some of its features, can be implemented in a computing device, e.g., the user device 610. In some embodiments, the user device 610 can include a client module 618. The client module 618 can, for example, be implemented as the client module 114 of FIG. 1. The network 650 can, for example, be implemented as the network 150 of FIG. 1. As discussed previously, it should be appreciated that there can be many variations or other possibilities.

Hardware Implementation

Figure 7:
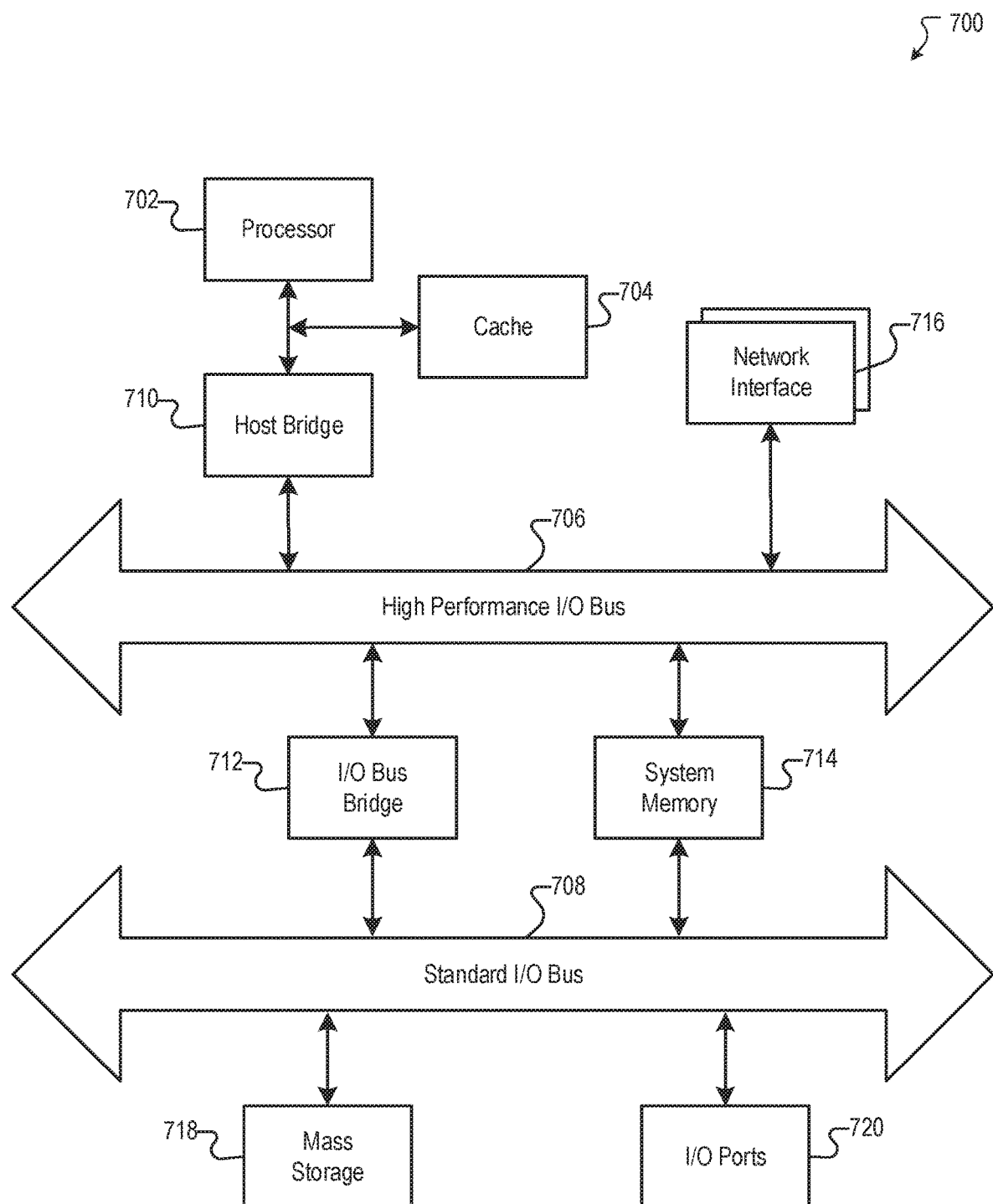
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   providing, by a computing device, a content item for presentation through a display screen, the presentation of the content item beginning at a first time position;
   determining, by the computing device, an adjustment to the presentation of the content item to correspond to a second time position;
   determining, by the computing device, a thumbnail preview associated with a period of time that corresponds to the second time position; and
   obtaining, by the computing device, the thumbnail preview that corresponds to the period of time, the obtaining further comprising:
      determining, by the computing device, a first access metric for a composite preview video associated with the content item;
      determining, by the computing device, a second access metric for a composite preview image associated with the content item; and
      obtaining, by the computing device, the thumbnail preview that corresponds to the period of time from the composite preview video based at least in part on the second access metric for the composite preview image or the composite preview image based at least in part on the first access metric for the composite preview video.

2. The computer-implemented method of claim 1, the method further comprising:
   causing, by the computing device, the thumbnail preview to be presented through the display screen.

3. The computer-implemented method of claim 1, wherein the composite preview video is composed of a set of frames that each correspond to a thumbnail preview for some portion of the content item.

4. The computer-implemented method of claim 1, wherein obtaining the thumbnail preview that corresponds to the period of time from the composite preview video based at least in part on the second access metric for the composite preview image further comprises:
   determining, by the computing device, that the second access metric for the composite preview image satisfies a threshold; and
   providing, by the computing device, at least one frame in the composite preview video as the thumbnail preview.

5. The computer-implemented method of claim 1, the method further comprising:
   generating, by the computing device, the composite preview video for the content item.

6. The computer-implemented method of claim 5, wherein generating the composite preview video for the content item further comprises:
   obtaining, by the computing device, a set of thumbnail preview images for the content item, each thumbnail preview image corresponding to some duration of the content item; and
   storing, by the computing device, the thumbnail preview images as frames of the composite preview video.

7. The computer-implemented method of claim 1, the method further comprising:
   receiving, by the computing device, the composite preview video for the content item from a content provider system through which the content item is being streamed.

8. The computer-implemented method of claim 1, wherein determining the adjustment to the presentation of the content item to correspond to the second time position further comprises:
  determining, by the computing device, that a video playback scrubber was moved to the second time position.

9. The computer-implemented method of claim 1, the method further comprising:
  generating, by the computing device, the composite preview image from the composite preview video.

10. The computer-implemented method of claim 1, wherein obtaining the thumbnail preview that corresponds to the period of time from the composite preview image based at least in part on the first access metric for the composite preview video further comprises:
  determining, by the computing device, that the first access metric for the composite preview video satisfies a threshold; and
  providing, by the computing device, at least one portion of the composite preview image as the thumbnail preview.

11. A computing device comprising:
  at least one processor; and
  a memory storing instructions that, when executed by the at least one processor, cause the system to perform:
  providing a content item for presentation through a display screen, the presentation of the content item beginning at a first time position;
  determining an adjustment to the presentation of the content item to correspond to a second time position;
  determining a thumbnail preview associated with a period of time that corresponds to the second time position; and
  obtaining the thumbnail preview that corresponds to the period of time, the obtaining further comprising:
    determining a first access metric for a composite preview video associated with the content item;
    determining a second access metric for a composite preview image associated with the content item; and
    obtaining the thumbnail preview that corresponds to the period of time from the composite preview video based at least in part on the second access metric for the composite preview image or the composite preview image based at least in part on the first access metric for the composite preview video.

12. The computing device of claim 11, wherein the instructions further cause the computing device to perform:
  causing the thumbnail preview to be presented through the display screen.

13. The computing device of claim 11, wherein the composite preview video is composed of a set of frames that each correspond to a thumbnail preview for some portion of the content item.

14. The computing device of claim 11, wherein obtaining the thumbnail preview that corresponds to the period of time from the composite preview video based at least in part on the second access metric for the composite preview image further causes the computing device to perform:
  determining that the second access metric for the composite preview image satisfies a threshold; and
  providing at least one frame in the composite preview video as the thumbnail preview.

15. The computing device of claim 11, wherein the instructions further cause the computing device to perform:
  generating the composite preview video for the content item.

16. A non-transitory computer-readable storage medium including instructions that, when executed by at least one processor of a computing device, cause the computing device to perform a method comprising:
  providing a content item for presentation through a display screen, the presentation of the content item beginning at a first time position;
  determining an adjustment to the presentation of the content item to correspond to a second time position;
  determining a thumbnail preview associated with a period of time that corresponds to the second time position; and
  obtaining the thumbnail preview that corresponds to the period of time, the obtaining further comprising:
    determining a first access metric for a composite preview video associated with the content item;
    determining a second access metric for a composite preview image associated with the content item; and
    obtaining the thumbnail preview that corresponds to the period of time from the composite preview video based at least in part on the second access metric for the composite preview image or the composite preview image based at least in part on the first access metric for the composite preview video.

17. The non-transitory computer-readable storage medium of claim 16, wherein the instructions further cause the computing device to perform:
  causing the thumbnail preview to be presented through the display screen.

18. The non-transitory computer-readable storage medium of claim 16, wherein the composite preview video is composed of a set of frames that each correspond to a thumbnail preview for some portion of the content item.

19. The non-transitory computer-readable storage medium of claim 16, wherein obtaining the thumbnail preview that corresponds to the period of time from the composite preview video based at least in part on the second access metric for the composite preview image further causes the computing device to perform:
  determining that the second access metric for the composite preview image satisfies a threshold;
  providing at least one frame in the composite preview video as the thumbnail preview.

20. The non-transitory computer-readable storage medium of claim 16, wherein the instructions further cause the computing device to perform:
  generating the composite preview video for the content item.

* * * * *